(12) United States Patent
Wang (10) Patent No.: US 6,436,044 B1
(45) Date of Patent: Aug. 20, 2002

(54) SYSTEM AND METHOD FOR ADAPTIVE BEAMFORMER APODIZATION

(75) Inventor: Hong Wang, Bellevue, WA (US)

(73) Assignee: Siemens Medical Solutions USA, Inc., Iselin, NJ (US)

( * ) Notice: Subject to any disclaimer, the term of this patent is extended or adjusted under 35 U.S.C. 154(b) by 0 days.

(21) Appl. No.: 09/503,796

(22) Filed: Feb. 14, 2000

(51) Int. Cl.[7] .................................................. A61B 8/00
(52) U.S. Cl. ...................................................... 600/443
(58) Field of Search ................................ 600/437, 443, 600/447, 458, 440, 441, 454–456; 73/602, 625, 626; 367/7, 11, 130, 135

(56) References Cited

U.S. PATENT DOCUMENTS

| | | | | |
|---|---|---|---|---|
| 5,555,534 A | * | 9/1996 | Maslak et al. ............... | 367/135 |
| 5,664,575 A | * | 9/1997 | Banjanin et al. ............. | 600/455 |
| 6,016,285 A | * | 1/2000 | Wright et al. ................. | 367/11 |
| 6,210,332 B1 | * | 4/2001 | Chiao et al. ................. | 600/443 |
| 6,282,963 B1 | * | 9/2001 | Haider ......................... | 73/602 |
| 6,312,384 B1 | * | 11/2001 | Chiao ........................... | 600/443 |
| 6,315,729 B1 | * | 11/2001 | Averkiou et al. ............ | 600/458 |

\* cited by examiner

*Primary Examiner*—Marvin M. Lateef
*Assistant Examiner*—Ali M. Imam (57) ABSTRACT

An ultrasound array imaging system (50) and method for improving beamforming quality and ultimately for improving an ultrasound image are disclosed. The ultrasound array imaging system (50) includes a transducer (52), a first beamformer (54), a second beamformer (56) and a comparator (58). The first beamformer (44) receives a first electronic echo signal from the transducer (52) and produces a first apodized beam signal in accordance with a first beamforming apodization function. The second beamformer (56) receives the same electronic echo signal from the transducer (52) and produces a second apodized beam signal in accordance with a second beamforming apodization function. The first and second apodized beam signals are compared in the comparator (58) which then combines the first and second apodized beam signals to create a combined apodized beam signal for producing an image that has its lateral and contrast resolution simultaneously optimized.

19 Claims, 6 Drawing Sheets

SYSTEM AND METHOD FOR ADAPTIVE BEAMFORMER APODIZATION

FIELD OF THE INVENTION

This invention relates to ultrasound systems in general and, more particularly, to systems and methods for improving the beamforming quality in ultrasound array imaging.

BACKGROUND OF THE INVENTION

Ultrasound is an increasingly common tool for viewing the internal body matter, such as organs or tissue, of a patient in real time. In an ultrasonic imaging system, acoustic signals are transmitted from a transducer into the patient. A portion of the acoustic signals are reflected by the body matter to create echoes that are received and interpreted to produce an image of the patient's body. In this interpretation process, beamformers are utilized to focus the received echo signals along a receive beam line. The resulting focused echo signals are used by a scan converter to form the image on a display.

Two important factors to consider in producing a quality image are the lateral and contrast resolution of the image. The lateral and contrast resolution are both directly dependent on the performance of a particular beamformer used in the ultrasonic imaging system. A point spread function in the lateral dimension is often used to illustrate how the lateral and contrast resolution of an image are affected by the use of the particular beamformer under a given geometry. A point spread function measures the intensity of a point target being imaged at each lateral dimension for a particular depth of the image field.

In general, the lateral resolution of an image is determined by the width of a main beam of a point spread function corresponding to the image, while the contrast resolution is dominated by sidelobe levels of the point spread function. The best lateral resolution is achieved by a sharp, main beamwidth. The best contrast resolution occurs when sidelobe levels are low. Unfortunately, one is often achieved at the cost of the other. For example, when a beamformer utilizes a boxcar apodization, the main beamwidth produced in the corresponding point spread function is sharp, but the sidelobe levels are high. In contrast, when a beamformer utilizes a hamming window apodization, the sidelobe levels produced in the corresponding point spread function are reduced at the cost of a wider beamwidth. As a result, for conventional ultrasound array imaging, lateral resolution and contrast resolution are generally not optimized at the same time.

Therefore, there is a need for an ultrasound array imaging system in which the beamwidth and sidelobe levels are optimized such that lateral and contrast resolution of an ultrasonic image are simultaneously enhanced.

SUMMARY OF THE INVENTION

In accordance with this invention, an ultrasound array imaging system and method for improving beamforming quality and ultimately for improving an ultrasound image are provided. In one embodiment of the invention, the ultrasound array imaging system includes a transducer, a first beamformer, a second beamformer and a comparator. The first beamformer receives electronic echo signals from the transducer and produces a first apodized beam signal in accordance with a first beamforming apodization. The second beamformer receives the same electronic echo signals from the transducer and produces a second apodized beam signal in accordance with a second beamforming apodization. The first and second apodized beam signals are compared in the comparator which then produces a combined, apodized beam signal for output to a scan converter for creating an improved ultrasound image.

In accordance with other aspects of this invention, the ultrasound array imaging system further includes a first amplitude detector for receiving the first apodized beam signal and a second amplitude detector for receiving the second apodized beam signal. The amplitude detectors produce amplitude detected, first and second apodized beam signals. The amplitude detected, first apodized beam signal represents the amplitudes of a number of points along a particular receive beamline used by the transducer to collect the original data as calculated using the first beamformer, while the amplitude detected, second apodized beam signal represents the amplitudes of the same points on the same receive beamline as calculated by the second beamformer.

The comparator receives the amplitude detected, first and second apodized beam signals and selects the data from the particular apodized beam signal that has the minimum value for that particular point. The selected minimum amplitude data is used to produce a single combined apodized beam signal for the particular receive beamline. This entire process is repeated for each receive beamline along which data is collected by the transducer.

In accordance with further aspects of this invention, the ultrasound array imaging system described above can function with multiple beamformers, each having a different apodization function, for producing multiple apodized beam signals. These multiple apodized beam signals can be similarly compared and combined by the comparator to produce a single combined apodized beam signal for transmission to a scan converter for creating an image on a display monitor.

In accordance with yet further aspects of this invention, instead of comparing first and second apodized beam signals produced using either a single beamformer programmed to calculate data in accordance with different apodizations or two separate beamformers each calculating data according to a different apodization, the ultrasound array imaging system can produce first and second sets of echo data that are created in response to a first and a second transmit pulse having a first and a second apodization respectively. In this embodiment, the first and second sets of echo data are produced using the same receive beamformer implementing a single receive apodization.

DETAILED DESCRIPTION OF THE PREFERRED EMBODIMENT

The present invention is an ultrasound system that produces ultrasound images in which the lateral resolution and contrast resolution are simultaneously enhanced.

Figure 1:
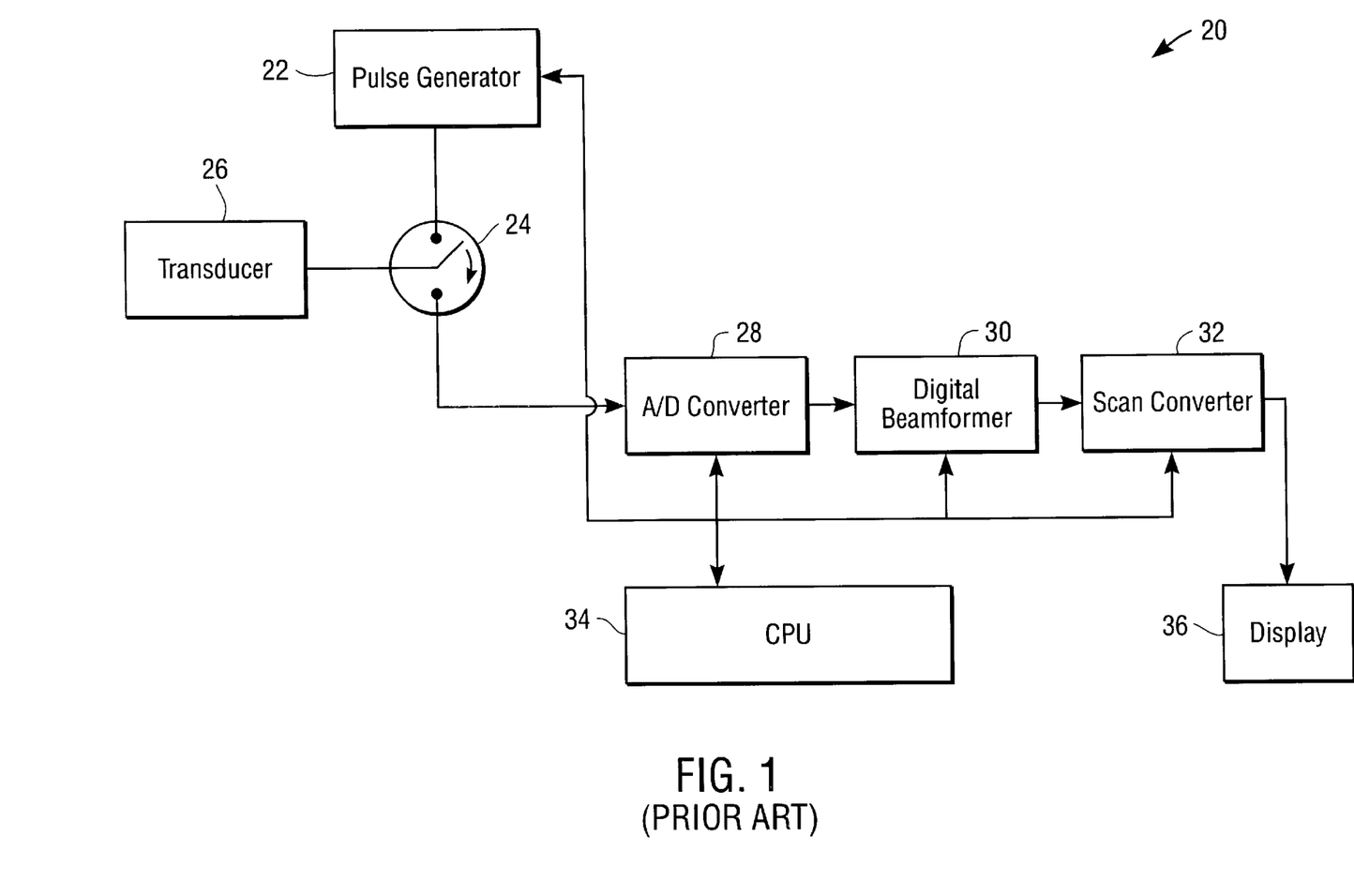
FIG. 1 is a simplified block diagram of a prior art ultrasound system.

FIG. 1 is a simplified block diagram of an exemplary prior art ultrasound system. The ultrasound system 20 includes a pulse generator 22 that generates a series of electronic signals that are optimized to produce echoes that can be detected and converted into an ultrasound image. The output of the pulse generator 22 is fed to a transmit/receive switch 24 that has two positions. In the first position, the output of the pulse generator is coupled to an ultrasound transducer 26. In the second position, the transmit/receive switch 24 couples electronic echo signals produced by the transducer in response to a received echo to an analog-to-digital converter 28.

The transducer 26 comprises an array of transducer elements, each of which is preferably a piece of piezoelectric material that converts the electronic pulses produced by the pulse generator 22 into an ultrasonic soundwave. The soundwave is reflected by the internal body matter of a patient to create echoes that are received by the transducer 26. Upon receiving an ultrasonic echo, each transducer element generates an electronic echo signal that is analyzed by the ultrasound system to produce an ultrasound image. The transducer 26 transmits a soundwave along each of a multitude of beamlines across the field to be imaged. Each of the transducer elements produces an electronic echo signal corresponding to data received along each beamline.

As indicated above, when the transmit/receive switch 24 is in the second position, the electronic echo signals produced by the transducer elements in response to a received echo along a particular receive beamline are coupled to the analog-to-digital converter 28. The analog-to-digital converter 28 samples the electronic echo signals to create a digitized version of the signals. The output of the analog-to-digital converter 28 is fed to a digital beamformer 30 that focuses and combines the selected samples of the electronic echo signals produced by the transducer elements to create a single binary number that is representative of the echo intensity at any given position in the body tissue along the particular beamline.

Figure 2:
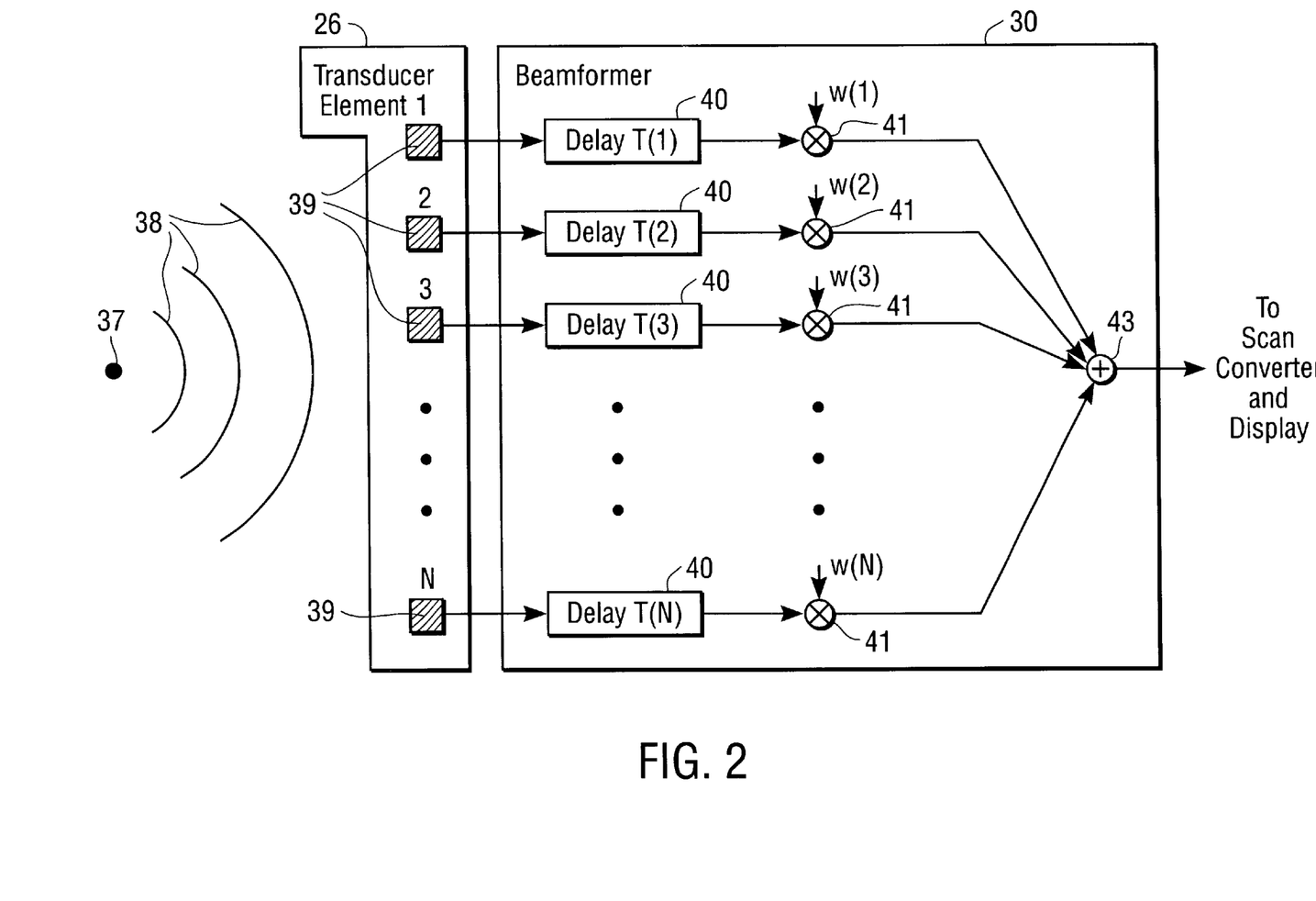
FIG. 2 is a simplified block diagram of the transducer and beamformer of the prior art ultrasound system of FIG. 1 depicted in further detail.

FIG. 2 illustrates in further detail the transducer 26 and beamformer 30 of the prior art ultrasound system of FIG. 1. The transducer 26 includes a set of "N" transducer elements 39, and the beamformer 30 includes a set of "N" delay blocks 40, a set of "V" weighting blocks 41, and a summing block 43. To produce an image of the body tissue, the transducer 26 generates an ultrasonic soundwave that is delivered into the patient. This soundwave is reflected by an object point 37 to create an ultrasonic echo 38. Upon receiving the ultrasonic echo 38, each of the N transducer elements 39 generates an electronic echo signal. The electronic echo signals are digitized by an A/D converter (not shown) and supplied to the beamformer 30.

To focus the received digitized electronic echo signals along a receive beamline, the beamformer 30 delays each of the "N" digitized electronic echo signals by an appropriate time "T(N)", as is well known by those skilled in the art and others, at delay blocks 40. Then, each of the delayed electronic echo signals is weighted according to a particular weighting function, or "apodization", at weighting blocks 41 as best shown in FIG. 2. In particular, each of the "N" delayed electronic echo signals are multiplied by a weighting factor "w(N)" in accordance with the particular apodization. In effect, more or less weight can be applied to electronic echo signals from various of the transducer elements. Finally, the weighted and delayed electronic echo signals are summed at summing block 43 to produce an apodized beam signal.

Typical apodizations known in the art include boxcar apodizations, hamming apodizations and hanning apodizations, among others. Typical beamformers, such as beamformer 30, implement only one of these particular apodizations. As the various types of apodizations have different characteristics, the apodized beam signals resulting from beamformers implementing various apodizations will also vary. As mentioned above, beamformers implementing the boxcar apodization will produce apodized beam signals that are used to generate an image having a point spread function with a sharp main beamwidth but high sidelobe levels, while a beamformer implementing the hamming apodization will produce apodized beam signals that are used to generate an image having a point spread function with low sidelobe levels at the cost of a sharp main beamwidth.

Returning to FIG. 1, the output of the digital beamformer 30 is ultimately fed to a scan converter 32 that converts the combined echo data into an array of pixel intensities which are used to produce a digital ultrasound image that is displayed on a display screen 36. Controlling the operation of the ultrasound system 20 is a central processing unit (CPU) 34 having its own internal and external memory in which data and the operating instructions of the CPU are stored. In addition, the CPU may be coupled to a mass storage device such as a hard drive, a communication circuit for transmitting and receiving data from a remote location such as other computers on a local area network or the Internet, and a video tape recorder or other image storage media for recording the ultrasound images produced.

As an alternative to the arrangement shown in FIG. 1, the beamformer may be an analog device that is directly coupled to the transducer elements. Such a beamformer functions similar to the digital beamformer 30. However, it delays and weights the received electronic echo signals from the transducer 26 prior to the electronic echo signals being digitized by an analog-to-digital converter.

Figure 3:
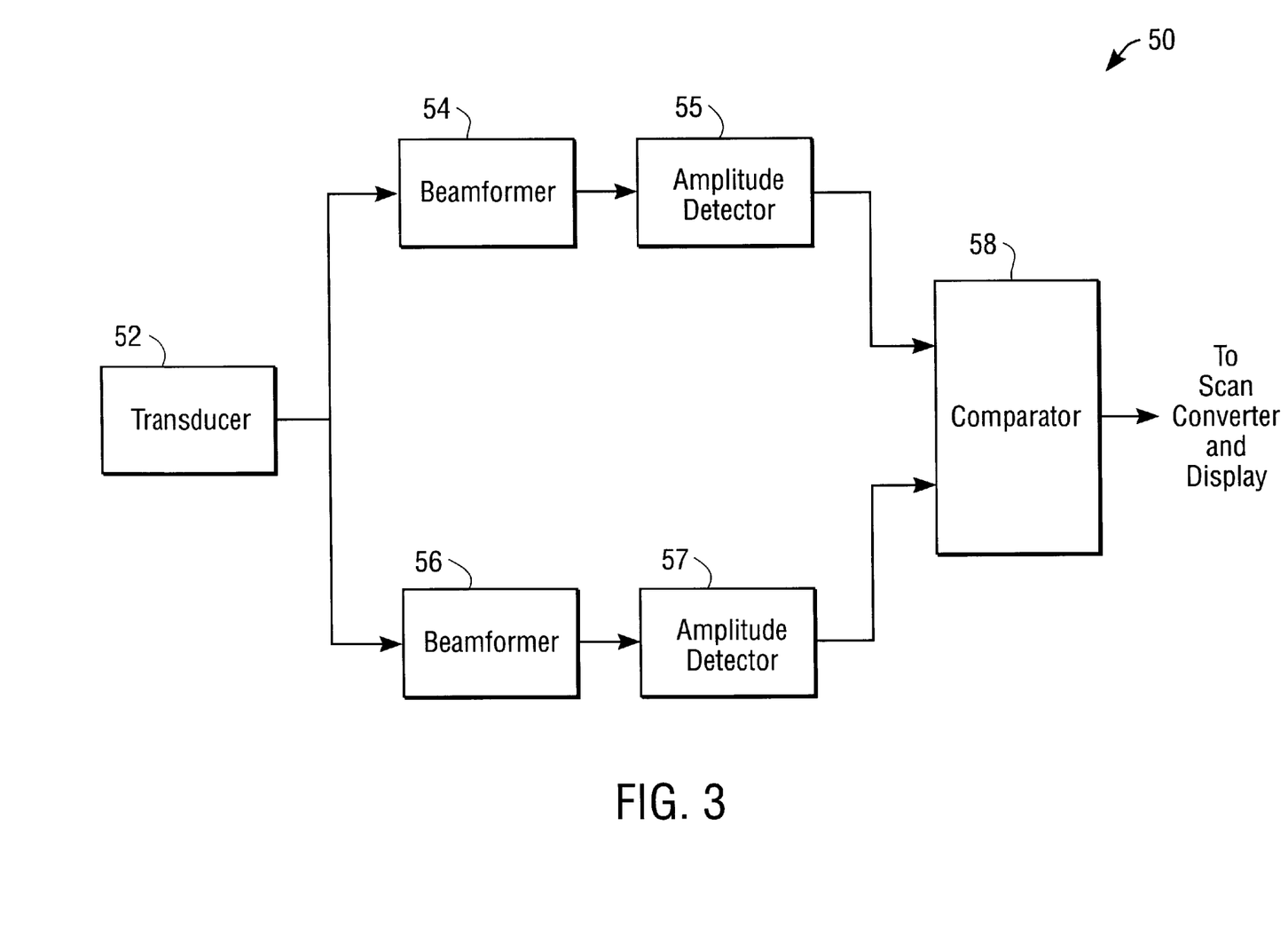
FIG. 3 is a simplified block diagram of an ultrasound array imaging system in accordance with an embodiment of the present invention.

FIG. 3 illustrates an ultrasound array imaging system 50 in accordance with one embodiment of the present invention. The ultrasound array imaging system 50 produces a compound apodized beam signal which simultaneously optimizes the lateral and contrast resolution of the resulting ultrasound image. The ultrasound array imaging system 50 includes a transducer 52, a first beamformer 54, a second beamformer 56, and a comparator 58. The transducer 52 is a typical ultrasound transducer that produces electronic echo signals as mentioned above with reference to FIGS. 1 and 2. In the ultrasound array imaging system 50 shown in FIG. 3, the same electronic echo signals are transmitted to two beamformers 54 and 56, rather than to a single beamformer as shown in FIGS. 1 and 2, after being digitized by an analog-to-digital converter (not shown).

Each of the beamformers 54 and 56 functions similar to the beamformer 30 described with reference to FIG. 2.

However, each of beamformers 54 and 56 apodizes the received electronic echo signals differently according to different apodizations. Accordingly, the first beamformer 52 utilizes a first beamforming apodization to produce a first apodized beam signal, while the second beamformer 54 utilizes a second beamforming apodization to produce a second apodized beam signal, both corresponding to the same electronic echo signals provided by the transducer 52. As mentioned above, examples of apodizations known in the art include the boxcar apodization, the hamming apodization, the hanning apodization, etc.

The ultrasound array imaging system 50 also includes a first amplitude detector 55 and a second amplitude detector 57. The first amplitude detector 55 ultimately receives the first apodized beam signal from the first beamformer 54 and detects the amplitudes provided by the first apodized beam signal corresponding to each of the points along a particular receive beamline. Similarly, the second amplitude detector 56 ultimately receives the second apodized beam signal from the second beamformer 56 and detects the amplitudes provided by the second apodized beam signal corresponding to each of the points along the same receive beamline. The resulting amplitude detected, first and second apodized beam signals are then individually fed to the comparator 58.

Generally, the comparator 58 normalizes each of the first and second apodized beam signals so that they can be properly compared. However, it will be appreciated by those skilled in the art and others that this normalization can alternatively be performed at each of the beamformers 54 and 56. As will be described in further detail below, the comparator 58 then compares the amplitude detected, first apodized beam signal with the amplitude detected, second apodized beam signal and combines the signals to output a single combined apodized beam signal. This combined apodized beam signal is ultimately transmitted to a scan converter for creating an image on a display.

More specifically, to normalize the first and second apodized beam signals, the comparator 58 adjusts each apodized beam signal by a normalizing factor such that the sum of the weighting factors "w(N)" utilized for each apodization multiplied by the normalization factor is the same, (where N is the number of transducer elements, or active channels in the beamformer).

After normalizing the first and second apodized beam signals, the comparator 58 compares the amplitudes of the first apodized beam signal with those of the second apodized beam signal. As mentioned above, each of the apodized beam signals represents points of data received by the transducer 52 along a single beamline. Thus, the comparator 58 is essentially comparing the amplitude, or intensity, of the first apodized beam signal with the second apodized beam signal at any given position in the body tissue along a particular beamline. The comparator 58 then produces a single combined apodized beam signal by identifying and utilizing the data from either the first or second apodized beam signal that has the minimum amplitude at each given position in the body tissue along a particular beamline, i.e. for each point along the beamline. The above process is repeated for each beamline along which the transducer receives data to produce the entire image.

It will be appreciated by those skilled in the art and others that the ultrasound array imaging system 50 may include other post-beamformer processing blocks and pre-amplitude detector processing blocks for each apodized beam signal as long as the functions implemented by these additional processing blocks are applied in parallel to the apodized beam signals produced from the beamformers 54 and 56. In particular, as will be appreciated by those skilled in the art and others, before detecting the amplitudes of the apodized beam signals, carrier frequency data, among other data contained in the apodized beam signals, may need to be stripped from the apodized beam signal. Thus, processing blocks performing such functions could be implemented after each beamformer. It will be further appreciated by those skilled in the art and others that other processing blocks can be utilized in the ultrasound array imaging system 50. For example, a log compressor can be used either before or after the comparator 58.

Figures 4, 5:
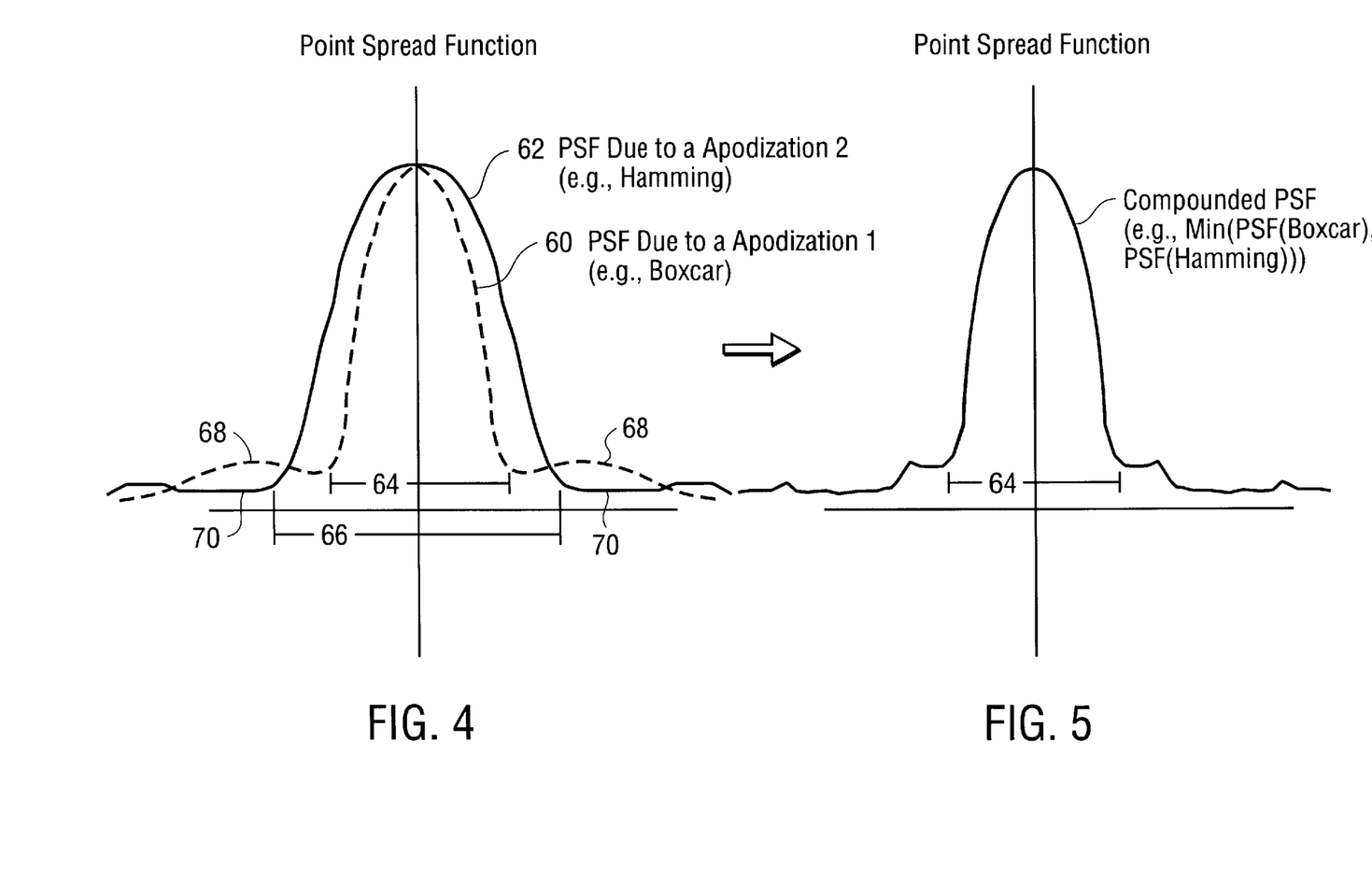
FIG. 4 is a graphic diagram illustrating the beamwidth and sidelobe levels of two point spread functions corresponding to the same image produced using two beamformers, each utilizing a different apodization.
FIG. 5 is a graphic diagram illustrating the beamwidth and sidelobe levels of the point spread function corresponding to an image produced using a compound apodized beam signal generated by the ultrasound array imaging system depicted in FIG. 3.

FIG. 4 illustrates an example of a first point spread function 60 in the lateral dimension corresponding to an image produced using the first beamformer 54 which implements a boxcar apodization and a second point spread function 62 in the lateral dimension corresponding to an image produced using the second beamformer 56 which implements a hamming apodization, both depicted on an xy-axis. A point spread function in the lateral dimension, (hereinafter simply referred to as "a point spread function"), measures the intensity of the points being imaged at each lateral dimension of the transducer 52, i.e., each lateral dimension of the image field, for a particular depth in the image field. The lateral dimension of the transducer 52, or the image field, is defined by the number of beams sampled by the transducer 52.

In this example, the object being imaged is a single point. Ideally, the image will depict this single point exactly at its precise location with the rest of the display remaining dark. However, due to soundwave interference and the particular apodization used by a beamformer, the image point produced on a display generally will not be a single point.

As shown in FIG. 4, the lateral beamwidth 64 of the first point spread function 60 is sharper, or narrower, than the lateral beamwidth 66 of the second point spread function. This means that the image represented by the first point spread function is sharper than the image represented by the second point spread function 62. On the other hand, the sidelobe levels 68 of the first point spread function 60 are greater than the sidelobe levels 70 of the second point spread function 62. This disparity represents the fact that the image represented by the first point spread function, although sharper, has more interference, i.e., worse contrast.

Thus, in this example, in order for the resulting image to have the best characteristics, i.e., a sharp image with minimal interference, the data from the first apodized beam signal that produces an image with sharp lateral resolution needs to be combined with the data from the second apodized beam signal that produces an image with enhanced contrast resolution in order to produce a single combined apodized signal having the best characteristics from each apodized beam signal. The comparator 58 performs this function.

In particular, for each receive beamline along which data is collected by the transducer, the comparator 58 compares the amplitudes for each of the points as provided by each of the first and second apodized beam signals; identifies the apodized beam signal that produces the minimum amplitude for each of the points, and utilizes the data from the identified apodized beam signal having the minimum amplitude for each point to create a single combined apodized beam signal. As a result, the combined apodized beam signal may include data from the first apodized beam signal for some of the points along the beamline and data from the second apodized beam signal for other of the points along the beamline. This process is repeated for each beamline along which data is collected by the transducer.

FIG. 5 illustrates a compound point spread function 75 corresponding to an image produced using the combined apodized beam signal produced by the comparator 58 in accordance with the above example described with reference to FIG. 4. As shown in FIG. 5, the compound point spread function 75 has the features of both a sharp lateral beamwidth 64 as in the first point spread function 60 and low sidelobe levels primarily as in the second point spread function 62. Thus, the resulting image of the object point most accurately depicts the actual object point as the image of the point is as sharp as possible with a minimum amount of surrounding interference.

It will be appreciated by those skilled in the art and others that the embodiment of the invention described above can be applied to images having multiple points for illumination on a display.

Figure 6:
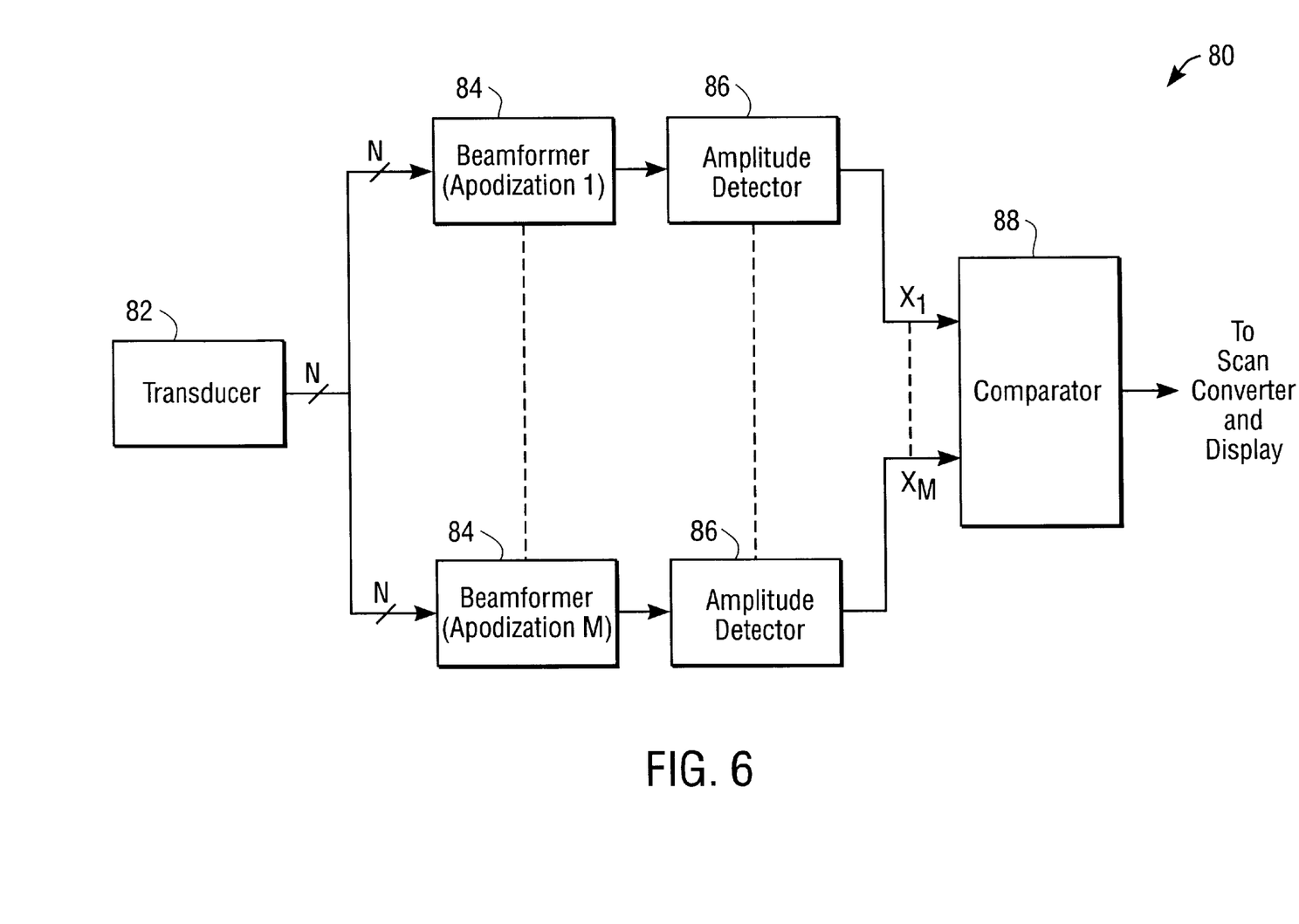
FIG. 6 is a simplified block diagram of an alternative embodiment of the ultrasound array imaging system of the present invention.

By way of a nonlimiting example, FIG. 6 illustrates an alternative embodiment of the ultrasound array imaging system described in reference to FIG. 3. It will be appreciated by those skilled in the art and others that this alternative embodiment of the ultrasound array imaging system is identical to the ultrasound array imaging system 50 described in reference to FIG. 3 with one main exception. The ultrasound array imaging system 80 depicted in FIG. 6 includes multiple beamformers 84, each implementing a different apodization. Again, each of the beamformers 84 ultimately receives electronic echo signals from a transducer 82 having N transducer elements after being digitized by an A/D converter (not shown). The resulting multiple apodized beam signals are processed in parallel as described with reference to the system depicted in FIG. 3 and are ultimately applied to a comparator 88 which similarly produces a single combined apodized beam signal as described above.

Figure 7:
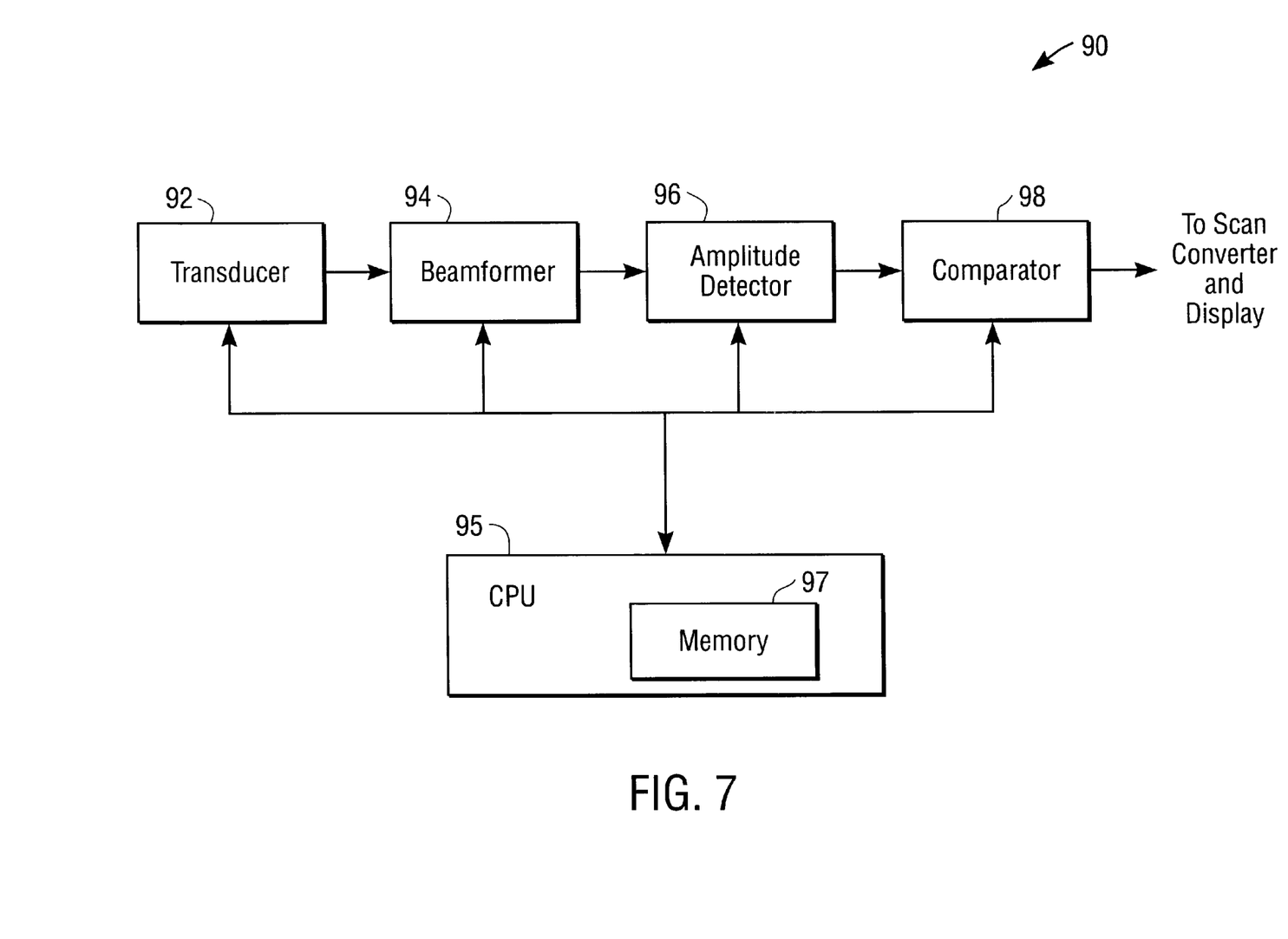
FIG. 7 is a simplified block diagram of yet another alternative embodiment of the ultrasound array imaging system of the present invention.

As another non-limiting example, FIG. 7 illustrates another alternative embodiment of the present invention. In particular, FIG. 7 illustrates an ultrasound array imaging system 90 that compares apodized beam signals on a frame-by-frame basis rather than comparing apodized beam signals on a beamline-by-beamline basis as described above. It will be appreciated by those skilled in the art and others that this alternative embodiment of the ultrasound array imaging system is identical to the ultrasound array imaging system 50 described in reference to FIG. 3 with two main exceptions.

First, the ultrasound array imaging system 90 includes only a single beamformer 94 and a single amplitude detector 96 which are used to process echo signals along each of a number of receive beamlines until an entire frame of data is collected and processed. In this regard, after the beamformer 94 of the ultrasound imaging system 90 processes the electronic echo signals received from a transducer 92 for an entire frame of data according to a first apodization and after the amplitude detector thereafter detects the amplitudes of the resulting first apodized beam signals, the amplitude detected, first apodized beam signals for the entire flame are stored in a memory 97, preferably of a CPU 95 controlling the ultrasound imaging system 90.

Next, the ultrasound imaging system 90 is programmed to process the same electronic echo signals for the same frame of data according to a second apodization and to then detect the amplitudes of the resulting second apodized beam signals. In this regard, after storing the amplitude detected, first apodized beam signals for the frame, the transducer again collects the same data along the same beamlines to produce the same electronic echo signals. The beamformer 94 is programmed to change how it weights the received electronic echo signals, i.e., to change its apodization, so that the received electronic echo signals are now processed according to a second apodization. Each of the resulting second apodized beam signals are applied to the amplitude detector 96 to produce an amplitude detected, second apodized beam signal. Once the amplitude detected, second apodized beam signals for the entire frame are collected, the amplitudes of the first set of apodized beam signals stored in the memory are compared with the amplitudes of the second set of apodized beam signals in a comparator 98 in a similar manner as described above with reference to comparator 58 to produce combined apodized beam signals for the entire frame of the image. It will be appreciated by those skilled in the art and others that in this embodiment the frame rate is effectively reduced, and that the image quality can be affected when imaging fast moving objects.

It will further be appreciated by those skilled in the art and others that the ultrasound system depicted in FIG. 7 could alternatively be programmed to store the electronic echo signals that are initially produced by the transducer and thereafter used to generate the first apodized beam signals. Such an ultrasound imaging system could then simply reuse the stored electronic echo signals to calculate the second apodized beam signals and amplitudes thereof. This eliminates the need for the transducer 92 to recollect the same data, (or substantially similar data when fast moving objects are being imaged). In this instance, the image quality for fast moving objects is improved since the identical electronic echo signals are being used in the separate apodization calculations. On the other hand, more memory is required to implement this embodiment.

In yet still another embodiment of the present invention, instead of calculating first and second apodization beam signals using electronic echo signals received from the transducer and then comparing these signals as described above, the pulse generator of an ultrasound imaging system can be programmed to transmit electronic pulses to the transducer in accordance with two or more apodizations. In this regard, the pulse generator includes the functionality necessary to delay and weight the pulses. Alternatively, it will be appreciated by those skilled in the art and others that a separate transmit beamformer may be utilized with the pulse generator to perform the delaying and weighting of the pulses generated by the pulse generator according to different apodizations. Examples of apodizations that can be used by the pulse generator (or a transmit beamform) include the boxcar apodization, the hamming apodization, the hanning apodization, etc.

In accordance with this embodiment, the pulse generator produces a first set of transmit pulses having a first apodization and transmits the first set of transmit pulses to the transducer for producing a first ultrasonic soundwave, which in turn is reflected from the internal body tissue of a patient to produce a first set of ultrasonic echoes. The first set of ultrasonic echoes are then received by the transducer and thereafter manipulated by a receive beamformer and amplitude detector as described above. The resulting amplitude detected, first transmit apodized beam signals are then stored for later comparison. The pulse generator then produces and transmits a second set of transmit pulses having a second apodization to the transducer for creating a second ultrasonic soundwave, which is reflected by the internal body tissue of the patient to produce second ultrasonic echoes. The second ultrasonic echoes are received by the transducer and are manipulated by the transducer, the same receive beamformer and the amplitude detector to ultimately produce amplitude detected, second transmit apodized beam signals. The amplitudes of the stored first transmit apodized beam signals are compared with the second transmit apodized beam signals as similarly described above to produce a combined transmit apodized beam signal for use by a scan converter to create an image on the display.

It will be appreciated by those skilled in the art and others, that the pulse generator can produce transmit pulses in accordance with first and second apodizations either on a beamline-by-beamline basis or on a frame-by-frame basis as similarly described above in reference to the embodiments where the various apodizations are performed by the receive beamformer(s).

In any of the above described embodiments, it will be further appreciated by those skilled in the art and others that the comparator can be positioned at any point between the amplitude detector and the display.

As will be readily appreciated by those skilled in the art and others, an ultrasound array imaging system formed in accordance with this invention has the key advantage of simultaneously optimizing the lateral and contrast resolution of the resulting image.

The embodiments of the invention in which an exclusive property or privilege is claimed are defined as follows:

1. An ultrasound array imaging system for improving beamforming quality, said system comprising:
   a transducer that collects electronic echo signals along a receive beamline;
   a first beamformer that receives the electronic echo signals and processes the electronic echo signals according to a first beamforming apodization to produce a first apodized beam signal;
   a second beamformer that receives the same electronic echo signals and processes the electronic echo signals according to a second beamforming apodization to produce a second apodized beam signal; and
   a comparator for comparing the first apodized beam signal with the second apodized beam signal and selecting data from the first or second apodized beam signal to produce a combined apodized beam signal, said combined apodized beam signal for feeding to a scan converter for creating an ultrasound image.

2. The ultrasound array imaging system of claim 1 further comprising:
   a first amplitude detector for detecting the amplitudes of points along the receive beamline as represented by the first apodized beam signal prior to comparing the first apodized beam signal with the second apodized beam signal; and
   a second amplitude detector for detecting the amplitudes of the same points along the same receive beamline as represented by the second apodized beam signal prior to comparing the first apodized beam signal with the second apodized beam signal.

3. The ultrasound imaging system of claim 2, wherein the comparator compares the first apodized beam signal with the second apodized beam signal and produces a combined apodized beam signal by:
   comparing the amplitudes of the points along the receive beamline as represented by the first apodized beam signal with the amplitudes of the same points along the same receive beamline as represented by the second apodized beam signal; and
   for each point along the receive beamline, utilizing data from the apodized beam signal having the minimum amplitude for that point to produce the combined apodized signal.

4. The ultrasound imaging system of claim 3, wherein the first apodized beam signal and the second apodized beam signal are each normalized prior to comparing the apodized beam signals to produce the combined apodized beam signal.

5. The ultrasound imaging system of claim 4, wherein the comparator normalizes the first and second apodized beam signals.

6. The ultrasound imaging system of claim 4, wherein the first beamformer normalizes the first apodized beam signal and the second beamformer normalizes the second apodized beam signal.

7. The ultrasound imaging system of claim 1 further comprising:
   one or more additional beamformers, each of which receives the same electronic echo signals as the first and second beamformers and processes the electronic echo signals according to another beamforming apodization to produce another apodized beam signal; and
   wherein the comparator compares the first, the second and the one or more additional apodized signals and selects data from the first, the second and the one or more additional apodized signals to produce a combined apodized signal, said combined apodized signal for feeding to a scan converter for imaging.

8. An ultrasound array imaging method for improving beamforming quality, said method comprising:
   producing an electronic echo signal in response to echoes received along a receive beamline;
   supplying the electronic echo signals to a first beamformer to produce a first apodized beam signal;
   supplying the electronic echo signals to a second beamformer to produce a second apodized beam signal;
   comparing said first apodized beam signal with said second apodized beam signal; and
   selecting data from the first or second apodized beam signal to produce a combined apodized beam signal from the first and second apodized beam signals for use in creating an ultrasound image.

9. The ultrasound imaging method of claim 8, wherein prior to comparing said first apodized beam signal with said second apodized beam signal, the amplitudes of points along the receive beamline as represented by the first apodized beam signal are detected and the amplitudes of the same points along the same receive beamline as represented by the second apodized beam signal are detected.

10. The ultrasound imaging method of claim 9, wherein the first and second apodized signals are compared by comparing the amplitudes for each of the points along the receive beamline as represented by the first apodized signal with the amplitudes of each of the same points along the same beamline as represented by the second apodized signal; and
   wherein the combined apodized signal is produced by (a) identifying, for each of the corresponding points along the receive beamline, whether the amplitude represented by the first or second apodized signal has the minimum value; and (b) for each of the points along the receive beamline, utilizing the data from the apodized signal that has the minimum amplitude to produce the combined apodized signal.

11. The ultrasound imaging method of claim 10, wherein prior to comparing said first apodized beam signal with said second apodized beam signal, the first and second apodized beam signals are normalized.

12. The ultrasound imaging method of claim 11 further comprising:

supplying the electronic echo signals to one or more additional beamformers to produce one or more additional apodized beam signals; and wherein the comparing of the first and second apodized signals further includes comparing the one or more additional apodized beam signals with the first and second apodized beam signals and wherein the combined apodized signal is produced from the first, second, and one or more additional apodized beam signals.

13. An ultrasound array imaging method for improving beamforming quality, said method comprising:

producing electronic echo signals in response to received echoes along a plurality of receive beamlines;

supplying the electronic echo signals to a beamformer to produce first apodized beam signals according to a first apodization;

storing the first apodized beam signals representing the echoes received along the plurality of receive beamlines;

supplying the same electronic echo signals to the beamformer a second time to produce second apodized beam signals according to a second apodization;

comparing the first apodized beam signals with the second apodized beam signals; and producing combined apodized beam signals from the first and second apodized beam signals for use in creating an ultrasound image.

14. The ultrasound imaging method of claim 13, wherein prior to storing the first apodized beam signals, the amplitudes of points along each of the plurality of receive beamline as represented by the first apodized beam signals are detected; and wherein after supplying the same electronic echo signals to the beamformer a second time to produce second apodized beam signals, the amplitudes of the points along each of the same plurality of receive beamlines as represented by the second apodized beam signal are detected.

15. The ultrasound imaging method of claim 14, wherein the first and second apodized signals are compared by comparing the amplitudes for each of the points along each of the plurality of receive beamlines represented by the first apodized signal with the amplitudes for each of the same points along each of the same plurality of receive beamlines represented by the second apodized signal; and wherein the combined apodized beam signals are produced by (a) identifying for each of the corresponding points along each of the plurality of receive beamlines whether the amplitude represented by the first or second apodized signal has the minimum value; and (b) for each of the points along each of the plurality of receive beamlines, utilizing the data from the apodized beam signal having the minimum amplitude to produce the combined apodized signals.

16. The ultrasound imaging method of claim 15, wherein prior to comparing the first apodized beam signals with the second apodized beam signals, the first and second apodized beam signals are normalized.

17. A method for improving beamforming quality in an ultrasound imaging system, said method comprising:

producing a first set of echo data created in response to a first set of transmit pulses having a first apodization;

producing a second set of echo data created in response to a second set of transmit pulses having a second apodization;

comparing the first and second sets of echo data and selecting data from the first and second sets of echo data to create a combined set of echo data; and creating an ultrasound image from the combined set of echo data.

18. The method of claim 17, wherein the step of comparing comprises:

comparing the amplitudes for each of a plurality of points represented by the first set of echo data with the amplitude for each of the same plurality of points represented by the second set of echo data;

identifying for each of the corresponding points whether the amplitude represented by the first or second set of echo data has the minimum value; and for each of the plurality of points, utilizing the data from the first or second set of echo data having the minimum amplitude to produce the combined set of echo data.

19. The method of claim 18, wherein the steps of producing first and second sets of echo data involves using the same receive beamformer apodization.

* * * * *